(12) United States Patent
Kuwahara

(10) Patent No.: US 6,278,406 B1
(45) Date of Patent: Aug. 21, 2001

(54) DIRECTION FINDER AND DEVICE FOR PROCESSING MEASUREMENT RESULTS FOR THE SAME

(75) Inventor: Yoshihiko Kuwahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/274,615

(22) Filed: Mar. 23, 1999

(30) Foreign Application Priority Data

Mar. 24, 1998 (JP) ................................................. 10-076026

(51) Int. Cl.$^7$ ....................................................... G01S 5/02

(52) U.S. Cl. ........................... 342/417; 342/432; 342/444; 342/445

(58) Field of Search ..................................... 342/417–449, 342/195, 196

(56) References Cited

U.S. PATENT DOCUMENTS 4,626,859 * 12/1986 Stansfield ............................. 342/442
4,641,143 * 2/1987 Apostolos ............................. 342/445
5,943,013 * 8/1999 Ohashi ................................. 342/417

* cited by examiner

*Primary Examiner*—Bernarr E. Gregory
(74) *Attorney, Agent, or Firm*—Ostrolenk, Faber, Gerb & Soffen, LLP

(57) ABSTRACT

A direction finder is provided that can measure the incoming angles of plural incoming signals without spatially moving antenna elements and can be used in outdoor mobile communication environments. The direction finder also can shorten the measurement time. An array antenna comprises plural antenna elements arranged at regular intervals. The received signal components due to the mutual coupling between the antenna elements are removed by multiplying time series signal groups by the inverse matrix of a coupling coefficient matrix of the array antenna. The time series signal groups are obtained by modulating signals received with the array antenna. The covariance matrix of the received signal group can be subjected to a movement averaging process in terms of the Vandermonde format. The coupling coefficient matrix of the array antenna is obtained by normalizing the measurement result of an array element pattern containing a mutual coupling with a measurement result of an element pattern of a sole antenna element not containing a mutual coupling and then by expanding the normalized result in a Fourier series.

8 Claims, 2 Drawing Sheets

$$S = \begin{bmatrix} a_{11} & a_{12} & S'_2 & a_{14} & a_{15} & a_{16} & a_{17} & a_{18} \\ a_{21} & a_{22} & a_{23} & a_2 & S'_3 & a_{26} & a_{27} & a_{28} \\ a_{31} & a_{32} & a_{33} & a_{34} & a_{35} & S'_4 & a_{37} & a_{38} \\ a_{41} & a_{42} & a_{42} & a_{44} & a_{45} & a_{46} & a_{47} & a_{48} \\ a_{51} & a_{52} & a_{53} & a_{54} & a_{55} & a_{56} & a_{57} & a_{58} \\ a_{61} & a_{62} & a_{63} & a_{64} & a_{65} & a_{66} & a_{67} & a_{68} \\ a_{71} & a_{72} & a_{73} & a_{74} & a_{75} & a_{76} & a_{77} & a_{78} \\ a_{81} & a_{82} & a_{83} & a_{84} & a_{85} & a_{86} & a_{87} & a_{88} \end{bmatrix}$$

(with $S'_1$ labeled over the matrix)

$\bar{S} = S_1 + S'_2 + S'_3 + S'_4$

S : ORIGINAL COVARIANCE MATRIX
$\bar{S}$ : COVARIANCE MATRIX AFTER MOVEMENT AVERAGING OPERATION

DIRECTION FINDER AND DEVICE FOR PROCESSING MEASUREMENT RESULTS FOR THE SAME

BACKGROUND OF THE INVENTION

The present invention relates to a direction finder with an array antenna, for measuring the incoming angles of plural incident signals to the array antenna in multipath environments such as urban spaces or indoors. The present invention also relates to a device for processing measurement results for the direction finder.

The MUSIC method or ESPRIT method is known as an algorithm for measuring the incoming angles of plural radio signal with no correlation that are received by an array antenna. These algorithms, which can provide excellent resolution and precision, compared with, for example, the conventional Fourier conversion method or the beam scanning method, have been widely applied to direction finders. However, the algorithm cannot accurately perform a specific value resolution because the factorial of a covariance matrix of a signal received by an array antenna is degenerated when correlative signals such as multipath waves are handled. This means that the incoming angle cannot be measured.

An approach of overcoming the above-mentioned drawback, is the movement averaging method In this method a matrix created by dividing a covariance matrix into plural matrix groups with equal orders, as shown in FIG. 3, is decomposed into specific values, and the factors of the divided matrix groups added together. Such a method is disclosed in the literature, "On Spatial Smoothing for Direction of Arrival Estimation of Coherent Signals", IEEE Trans on ASSP Vol. 33(4), 1985. In order to apply the movement averaging method, it is essential that the covariance matrix is in a Vandermode format. In the array antenna for a direction finder, the antenna elements are arranged at regular intervals. The received phase response (a) must be expressed as shown by the following formula (1):

$$a = -\exp(jnkd \sin \theta) \quad (1)$$

where n is the number of an antenna element; k is a wave number; d is an element spacing; and $\theta$ is an incoming angle.

However, the movement averaging method cannot be applied to an actual array antenna because the received phase response (a) is not linearly expressed as shown by the formula (1) due to the mutual coupling between antenna elements even when antenna elements are arranged at regular intervals. Many literatures disclose the technique of measuring the incoming directions of plural correlative signals using the above-mentioned movement averaging method. In any of the techniques, the incoming angle is measured by spatially moving a sole antenna element at regular intervals to avoid the interference of the mutual coupling. Any trouble does not occur even when an antenna element is spatially moved in a static environment such as indoor environment limiting no measurement time. However, the conventional technique is impractical in the case when the antenna element is mechanically moved in outdoor mobile communication environments where the propagation condition momentarily changes, in consideration of the measurement time.

SUMMARY OF THE INVENTION

The present invention is made to solve the above-mentioned problems.

This invention provides a direction finder that can measure the incoming angles of plural correlative signals using the respective signals received by antenna elements configuring an array antenna.

Furthermore, the invention provides a direction finder which does not require the spatial movement of the antenna elements and can be applied to outdoor mobile communication environments.

The invention also provides a direction finding method for measuring the incoming angles of plural correlative signals using the respective signals received by antenna elements configuring an array antenna.

The invention also provides a measurement result processing method suitable for a direction finder.

The objective of the present invention is achieved by a direction finder comprising an array antenna including plural antenna elements arranged at regular intervals in a straight line or in a plane state; a receiver for receiving a signal received with each of the antenna elements in the array antenna and then outputting demodulated signal groups; a front end processor for multiplying the demodulated signal groups to be chronologically obtained by an inverse matrix of a coupling coefficient matrix of the array antenna and then outputting time series signal groups; and a signal processing unit for obtaining a covariance matrix in response to output signal groups from the front end processor, subjecting the covariance matrix to a movement averaging process, and then resolving the result into specific values to obtain an incoming azimuth.

Furthermore, according to the present invention, a measurement result processing device obtains a mutual coupling matrix by normalizing a measurement result of an array element pattern containing a mutual coupling with a measurement result of an element pattern of a sole antenna element not containing a mutual coupling and then expanding the resultant normalized pattern in a Fourier series.

In the direction finder according to the present invention, the coupling coefficient matrix of the array antenna is obtained by normalizing a measurement result of an array element pattern containing a mutual coupling with a measurement result of an element pattern of a sole antenna element not containing a mutual coupling and then expanding the resultant normalized pattern in a Fourier series.

In a direction finder according to the present invention, a movement averaging process can performed by multiplying a time series signal group by an inverse matrix of a coupling coefficient matrix of an array antenna to remove received signal components due to a mutual coupling between antenna elements, the time series signal group being obtained by demodulating a signal received with the array antenna, the array antenna being formed of plural antenna elements arranged at regular intervals, and by making the covariance matrix of a received signal group in a Vandermonde format.

In the direction finder according to the present invention, the signal processing unit comprises a covariance matrix creating unit for creating a covariance matrix from a snapshot in a time series signal group from which a mutual coupling is removed, a movement averaging unit for obtaining a movement average matrix by moving in parallel from the covariance matrix, a specific value resolving unit for resolving a specific value from a movement average matrix, a wave number estimating unit for judging a wave number based on a specific value obtained through the specific value resolving step, and a MUSIC spectrum plotting unit.

In the direction finder according to the present invention, the movement averaging unit divides a covariance matrix obtained with a linear array antenna into sub-array matrixes and then adds the sub-array matrixes.

In the direction finder according to the present invention, the specific value resolving unit obtains N specific values λi (i=1 to N) by resolving a movement-averaged covariance matrix into specific values.

In the direction finder according to the present invention, the wave number estimation processing unit estimates a wave number from a distribution of specific values.

Furthermore, according to the present invention, a direction finding method comprises the steps of multiplying a time series signal group by an inverse matrix of a coupling coefficient matrix of an array antenna to remove received signal components due to a mutual coupling between antenna elements, the time series signal group being obtained by demodulating a signal received with the array antenna, the array antenna being formed of plural antenna elements arranged at regular intervals; and making the covariance matrix of a received signal group in a Vandermonde format, whereby a movement averaging process is performed.

Moreover, according to the present invention, a measurement result processing method comprises the steps of normalizing a measurement result of an array element pattern containing a mutual coupling with a measurement result of an element pattern of a sole antenna element not containing a mutual coupling; and then expanding the resultant normalized pattern in a Fourier series, whereby a mutual coupling matrix is obtained.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Embodiments of the present invention will be described below with reference to the attached drawings.

Figure 1:
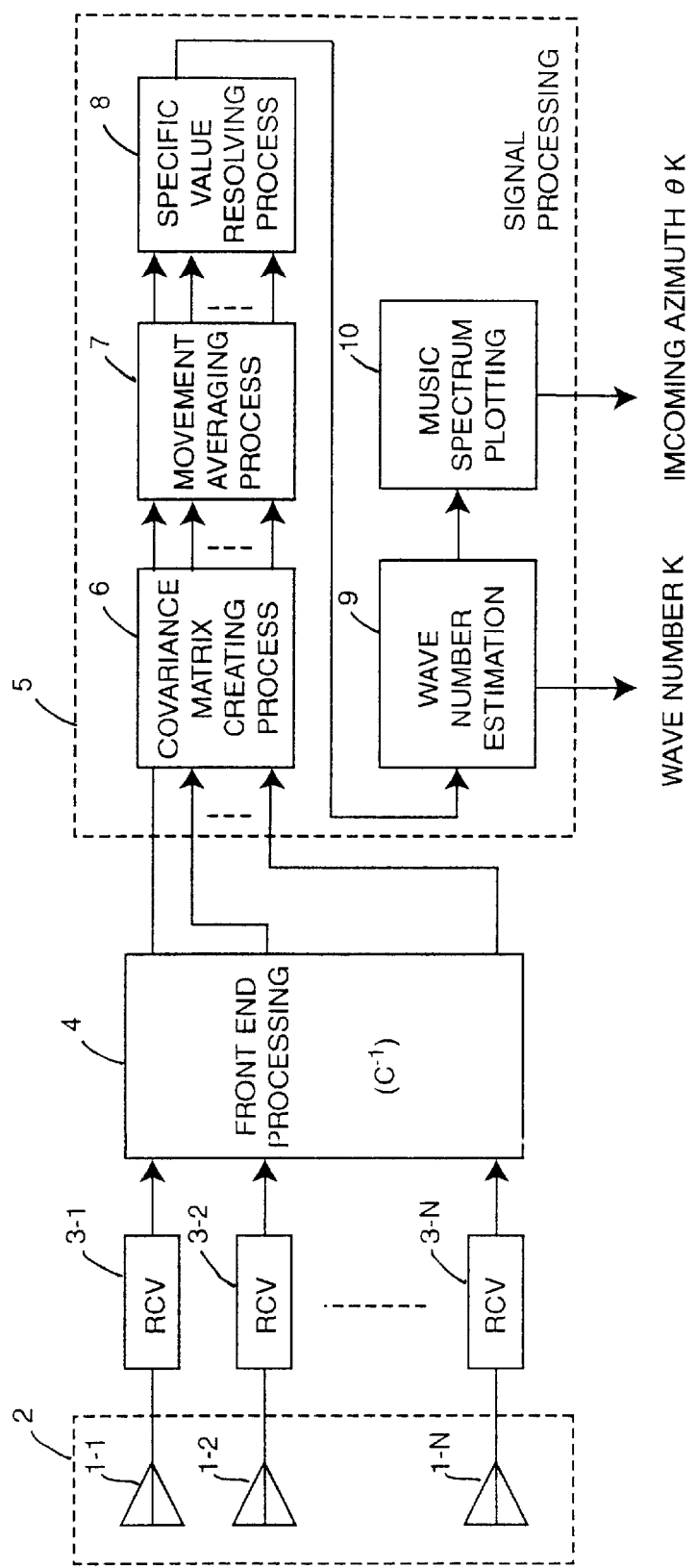
FIG. 1 is a block diagram illustrating a direction finder according to an embodiment of the present invention.

FIG. 1 is a block diagram illustrating a direction finder according to an embodiment of the present invention. The direction finder of the present invention comprises an array antenna 2 formed of N antenna elements 1-1 to 1-N, N receivers 3-1 to 3-N respectively connected to the antenna elements, and a front end processor 4, a signal processing unit 5.

The front end processor 4 removes signal components due to the mutual coupling between antenna elements from received signal groups by multiplying the time series group of a received signal by the inverse matrix of the coupling coefficient matrix of an array antenna. The front end processor 4 then sends a received signal group to be subjected to a mobile averaging process, to the signal processor 5.

Next, the operation of the front-end processor 4 will be described below with reference to FIG. 2.

Figures 2, 3:
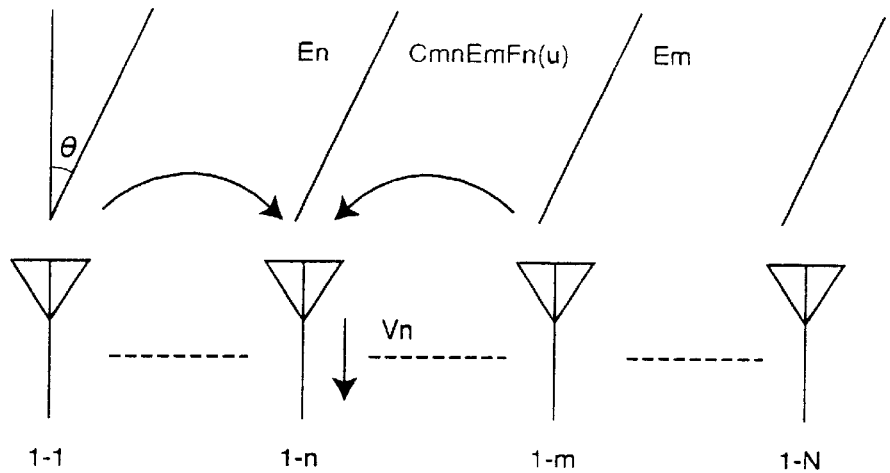
FIG. 2 is a diagram illustrating the operation for removing signal components from a received signal group by mutually coupling elements, according to the present invention.
FIG. 3 is a diagram illustrating a movement averaging process of a covariance matrix according to an embodiment of the present invention.

Referring to FIG. 2, when a plane wave enters the array antenna including plural antenna elements 1-1 to 1-N, the signal Vn received by the n-th antenna element is a vector sum of the main component received by the n-th antenna element itself and the component re-radiated from the n-th antenna element itself or an adjacent antenna. The signal Vn(u) received by the antenna element n is expressed by the following formula (2):

$$Vn(u) = CmnEnF(u) + \sum_{m \neq n} CmnEmF(u) \quad (2)$$

where F(u) is an element pattern with no mutual coupling; Cmn is the coupling coefficient between the m-th element and the n-th element; Em is an incident electric field of the element m; En is an incident electric field of the element n; and u is a sine of an angle θ.

A signal vn(u) received by a sole antenna element and having no coupling is expressed by the following formula (3):

$$EnF(u)=vn(u) \quad (3)$$

If the amplitude E of a plane wave entering from the direction of an array antenna with elements arranged at regular intervals is expressed by the following formula (4):

$$E \exp(jnkdu) F(u)=vn(u) \quad (4)$$

The following expression is obtained by substituting the formula (4) for the formula (2).

$$V=Cv \quad (5)$$

where $V=[V1\ V2\ \ldots\ Vn]^T$; $v=[v1\ v2\ \ldots\ vn]^T$; C=[Cmn] (a coupling matrix of N rows and N columns) and T is a disposition matrix. In order to obtain a received signal group v with no mutual coupling from the formula (5), the following formula (6) is calculated.

$$V=C^{-1}V \quad (6)$$

The coupling matrix C is obtained by measuring an array element pattern Gn(u) containing a mutual coupling and an element pattern F(u) of a sole element not containing a mutual coupling.

The array element pattern Gn(u) is expressed by the following formula (7).

$$Gn(u) = F(u)\sum_{n=1} Cmn\exp(jnkdu) \quad (7)$$

where Gmn is a Fourier series of an array element pattern and is obtained by the following formula (8).

$$Cmn=\tfrac{1}{2}\pi \int (Gn(u)/F(u))\exp(-jnkdu)du \quad (8)$$

where the integration range is [−/kd to /kd].

The array element pattern is assumed to be a pattern obtained by superimposing an element pattern on a radiation pattern of an array antenna having a weight of Cmn. The aperture current distribution and the radiation pattern of an antenna are expressed by a Fourier transformation. The formula (8) has a physical meaning. That is, a pattern defined by re-radiation from other antenna elements and the self antenna element is obtained by using the formula Gn(u)/F(u). Then the pattern is subjected to a Fourier transformation to obtain a weight of Cmn. The weight Cmn for each antenna element is calculated using the formula (8). Then an inverse C−1 is obtained by creating a coupling matrix.

As described above, the front end processor calculates the time series signals obtained by demodulating signals received by antenna elements and then removes signal components due to mutual coupling from the calculated results, by using the formula (6). Then front-end processor 4 outputs the result signals to the signal processing unit 5.

The signal processing unit 5 comprises a covariance matrix creating unit 6 which creates a covariance matrix S from a snapshot in a time series signal group from which a mutual coupling is removed. A movement averaging unit 7 obtains a movement average matrix by moving in parallel from the covariance matrix S. A a specific value resolving unit 8 resolves a specific value from the movement average matrix. A wave number estimating unit 9 determines a wave number based on a specific value obtained through the specific value resolving unit. Signal processing unit 5 further comprises MUSIC spectrum plotting unit 10.

As shown in FIG. 3, the movement averaging unit 7 divides a covariance matrix S obtained with the linear array antenna of the N(8) element into, for example, sub-array matrixes S1' to S4' each formed of 5×5 elements and then adds the sub-array matrixes S1' to S4'. Thus, the correlation between incoming signals can be suppressed by spatially performing a moving average.

The specific value resolving unit 8 obtains N specific values $\lambda i$ (i=1 to N) by resolving a movement-averaged covariance matrix into specific values. As shown in the formula (9), the specific value $\lambda i$ (where i=1 to N) has large components ($\lambda i$ to $\lambda d$) corresponding to a signal and small components ($\lambda_{d+1}$ to $\lambda_N$) corresponding to noises.

$$\lambda_1 > \lambda_2 \ldots > \lambda_d >> \lambda_{d+1} = \ldots = \lambda_N = \sigma^2 \qquad (9)$$

The wave number estimation processing unit 9 estimates a wave number K(d) from the distribution of specific values shown by the formula (9).

There are two approaches for obtaining the incoming azimuth of each signal: (1) ESPRIT method that can obtain an incoming azimuth by using a specific vector corresponding to a signal component and the rotational invariance of an array antenna and (2) MUSIC method that can obtain an incoming azimuth by using a specific vector corresponding to noises and searching MUSIC (Multiple Signal Classification) spectrum. The MUSIC method is used in this embodiment.

The MUSIC spectrum P(u) is expressed by the following formula (10).

$$P(u) = \sum_{I=d+1}^{N} 1/a^H(u)EiEi^H a(u) \qquad (10)$$

Where a(u)=[exp(jkdu), exp(j2kdu), ..., exp(jNkdu)]$^T$; H is a conjugate inversion; and Ei(I=d+1 to N) is a specific vector corresponding to noises.

When the MUSIC spectrum is calculated in a range of −1<u<1, a sharp peak is observed at a position corresponding to an incoming angle. An incoming angle θk is obtained based on the peak position.

As described above, in the direction finder according to the present invention, the received signal components due to the mutual coupling between antenna elements are removed by multiplying a time series signal group by an inverse matrix of a coupling coefficient matrix of an array antenna. The time series signal group is obtained by demodulating signals received by an array antenna, which is formed of plural antenna elements arranged at regular intervals. Since the covariance matrix of the received signal group becomes a Vandermonde format, the movement averaging process can be performed. Hence, the incoming angles of plural correlative incoming signals can be measured without spatially moving the array antenna in a conventional manner. As a result, a direction finder that can shorten the measurement time and deal with in outdoor mobile communication environments can be realized.

The entire disclosure of Japanese Application No. 10-076026 filed Mar. 24, 1998 including specification, claims, drawing and summary are incorporated herein by reference in its entirely.

What is claimed is:

1. A direction finder for determining an incoming azimuth of incoming signals, said direction finder comprising:
   an array antenna including a plurality of antenna elements;
   a receiver which receives signals received with said antenna elements in said array antenna and outputs demodulated signal groups in response thereto;
   a front end processor which multiplies said demodulated signal groups by an inverse matrix of a coupling coefficient matrix of said array antenna, said front end processor outputs time series signal groups in response thereto; and
   a signal processing unit which produces a covariance matrix in response to said time series signal groups applies a movement averaging process to said covariance matrix to produce a result, and resolves said result into specific values to obtain said incoming azimuth.

2. The direction finder recited in claim 1, wherein said coupling coefficient matrix of said array antenna is obtained by normalizing a measurement result of an array element pattern having a mutual coupling with a measurement result of an element pattern of a sole antenna element not having a mutual coupling to produce a normalized pattern, and then expanding said normalized pattern in a Fourier series.

3. The direction finder recited in claim 1, wherein said signal processing unit comprises:
   a covariance matrix creating unit which creates a covariance matrix from said time series signal group;
   a movement averaging unit which obtains a movement average matrix by moving in parallel with said covariance matrix;
   a specific value resolving unit which produces a specific value from said movement average matrix;
   a wave number estimating unit which determines a wave number based on said specific value obtained from said specific value resolving unit; and
   a MUSIC spectrum plotting unit which processes said wave number to produce said incoming azimuth.

4. The direction finder recited in claim 3, wherein said movement averaging unit obtains said movement average matrix by dividing said covariance matrix into sub-array matrixes and then adding said sub-array matrixes.

5. The direction finder recited in claim 3, wherein said specific value resolving unit obtains N specific values [$\lambda i$ (i=1 to N)] by resolving said movement average matrix into specific values.

6. The direction finder recited in claim 3, wherein said wave number estimating unit estimates said wave number from a distribution of specific values produced from said specific value resolving unit.

7. A method for determining a direction of incoming signals incident upon an array antenna, said method comprising the steps of:
   determining a coupling coefficient matrix of said array antenna;

receiving said incoming signals;

demodulating said incoming signals to produce a time series signal group;

multiplying said time series signal group by an inverse matrix of said coupling coefficient matrix to remove received signal components produced by a mutual coupling between antenna elements of said array antenna;

determining a covariance matrix of said time series signal group; and converting said covariance into a Vandermonde format.

8. A method for processing a measurement result, said method comprising the steps of:

normalizing a measurement result of an array element pattern having a mutual coupling with a measurement result of an element pattern of a sole antenna element not having a mutual coupling to produce a normalized pattern; and thereafter expanding said normalized pattern in a Fourier series, thereby producing a mutual coupling matrix.

* * * * *